United States Patent
Das

(10) Patent No.: US 7,707,395 B2
(45) Date of Patent: Apr. 27, 2010

(54) DATA PROCESSING SYSTEM WITH TRACE CO-PROCESSOR

(75) Inventor: Dibakar Das, Bangalore (IN)

(73) Assignee: NXP B.V., Eindhoven (NL)

( * ) Notice: Subject to any disclaimer, the term of this patent is extended or adjusted under 35 U.S.C. 154(b) by 79 days.

(21) Appl. No.: 11/596,326

(22) PCT Filed: May 4, 2005

(86) PCT No.: PCT/IB2005/051467

§ 371 (c)(1),
(2), (4) Date: Nov. 10, 2006

(87) PCT Pub. No.: WO2005/109203

PCT Pub. Date: Nov. 17, 2005

(65) Prior Publication Data

US 2007/0214341 A1    Sep. 13, 2007

(30) Foreign Application Priority Data

May 12, 2004    (EP)    .................................. 04102049

(51) Int. Cl.
*G06F 9/00* (2006.01)
(52) U.S. Cl. ........................ 712/227; 712/205; 712/208
(58) Field of Classification Search ................. 712/205, 712/208, 227
See application file for complete search history.

(56) References Cited

U.S. PATENT DOCUMENTS

| | | | | |
|---|---|---|---|---|
| 5,056,013 A | * | 10/1991 | Yamamoto | 703/28 |
| 5,943,498 A | * | 8/1999 | Yano et al. | 717/128 |
| 6,009,270 A | * | 12/1999 | Mann | 717/128 |
| 6,041,406 A | * | 3/2000 | Mann | 712/227 |
| 6,154,857 A | * | 11/2000 | Mann | 714/30 |
| 6,167,536 A | * | 12/2000 | Mann | 714/45 |
| 6,175,914 B1 | * | 1/2001 | Mann | 712/227 |
| 6,240,509 B1 | | 5/2001 | Akkary | |
| 6,314,530 B1 | * | 11/2001 | Mann | 714/38 |
| 6,438,715 B1 | * | 8/2002 | Assouad | 714/45 |
| 6,507,923 B1 | * | 1/2003 | Wall et al. | 714/712 |
| 6,542,844 B1 | | 4/2003 | Hanna | |
| 6,615,370 B1 | | 9/2003 | Edwards et al. | |
| 6,779,145 B1 | * | 8/2004 | Edwards et al. | 714/733 |

(Continued)

FOREIGN PATENT DOCUMENTS

CN    1286771 A    3/2001

(Continued)

OTHER PUBLICATIONS

Free On-line Dictionary of Computing. © 2003. www.foldoc.org search term: UART.*

(Continued)

*Primary Examiner*—Aimee J Li

(57) ABSTRACT

The present invention relates to a processing device and a tracing system and method for providing to an external debugging device a trace information relating to an application program. A trace processor (40) is provided in order to relieve a main processor (10) of tasks relating to tracing. The main processor stores trace information in a trace memory (30) via a first port, while the trace processor (40) reads the stored trace information via a second port. Thereby, sufficient trace information can be made available without influencing the performance of the main processor.

13 Claims, 3 Drawing Sheets

U.S. PATENT DOCUMENTS

Figure 1:
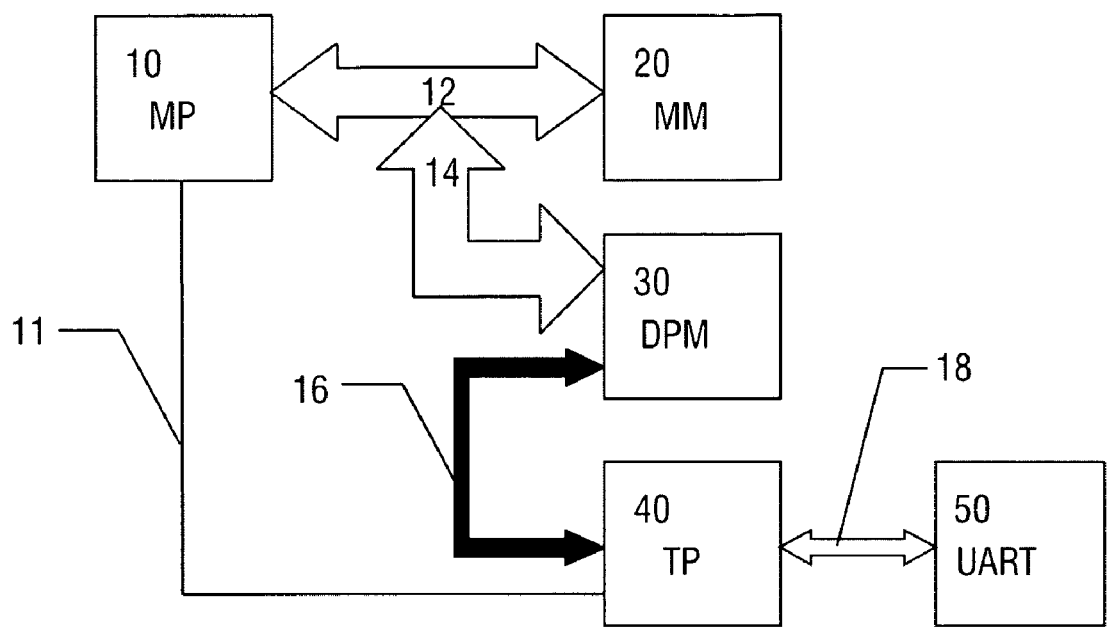

| | | | |
|---|---|---|---|
| 6,915,466 B2 * | 7/2005 | Mastro et al. | 714/712 |
| 6,934,891 B2 * | 8/2005 | Kawaguchi et al. | 714/48 |
| 7,360,024 B2 * | 4/2008 | Hironaka et al. | 711/131 |
| 7,398,437 B2 * | 7/2008 | Mastro et al. | 714/712 |
| 2002/0091977 A1 * | 7/2002 | Mastro et al. | 714/712 |
| 2002/0124140 A1 * | 9/2002 | Kawaguchi et al. | 711/118 |
| 2003/0018929 A1 | 1/2003 | Bardsley et al. | |
| 2004/0078690 A1 * | 4/2004 | Kohashi | 714/38 |
| 2004/0088489 A1 * | 5/2004 | Hironaka et al. | 711/131 |
| 2004/0250164 A1 | 12/2004 | Ahmad et al. | |
| 2005/0210343 A1 * | 9/2005 | Mastro et al. | 714/712 |
| 2005/0289400 A1 * | 12/2005 | Kimura | 714/45 |

FOREIGN PATENT DOCUMENTS

| | | |
|---|---|---|
| CN | 1336588 A | 2/2002 |

OTHER PUBLICATIONS

International Preliminary Report on Patentability for Int'l Patent Appln. PCT/IB2005/051467 (Nov. 15, 2006).

* cited by examiner

DATA PROCESSING SYSTEM WITH TRACE CO-PROCESSOR

The present invention relates to a processing device, tracing system and method for providing a trace information relating to an application program, so as to be capable of providing a trace feature for example in embedded systems.

Most software developers spend a significant portion of their time looking for bugs in software. Traditionally, this is done using a start/stop debugger. Using such a debugger, break points can be defined at which the system is to stop, an then the state of the system can be examined when the running program hits a break point. Based on the examination result, software problems or errors can be identified.

Unfortunately, such techniques are almost useless for real-time systems, since stopping the system changes its real-time behavior. This causes problems one is trying to debug to disappear as soon as a break point is introduced. As a solution, a real-time software trace technique has been developed, in which the same hardware captures the sequence of instructions and possibly data accesses, executed by the processor. The developer may then use this historical record or trace log of the behavior of the processor to investigate the bug.

In recent years, processors have included real-time trace facilities. The easy availability of such real-time trace facilities allows new debugging paradigms to be developed. Such real-time trace facilities capture a trace of the instructions executed by a processor, running in real-time, and stores these instructions in a buffer for later analysis. In addition to the instructions executed, the data used by those instructions may be captured. It is typically possible to select which instructions or data is captured. An instruction trace shows the flow of execution of the processor and provides a list of all instructions that were executed. Instruction traces can be significantly compressed by broadcasting branch addresses only, along with a set of status signals that indicate the pipeline status on a cycle-by-cycle basis. On the other hand, data traces show the data accesses performed by the processor that occur as a result of the processor executing a load or store operation. For data accesses, it is possible to broadcast both the address and the data. Data traces can be compressed by only broadcasting either address or data.

Additionally, it is typically possible to select a trigger condition, such as an execution of a particular instruction, or writing a particular value to a particular location in a memory. Much more complex trigger conditions are also sometimes available. When the trigger condition occurs, the buffer stops capturing the trace data, either immediately or some time later, hence ensuring that the buffer retains a trace of the systems behavior around the time of occurrence of the trigger condition.

Figure 5:
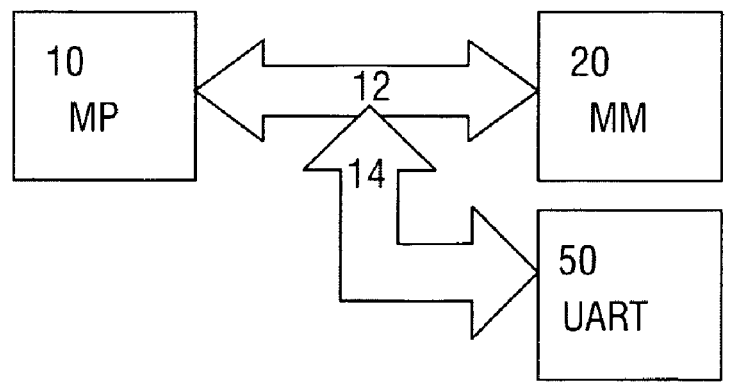

FIG. 5 shows a schematic block diagram of a traditional real-time trace system comprising a main processor 10, connected via a first bus system 12 to a main memory 20, and connected via an additional second bus system 14 to an interface unit, e.g. a Universal Asynchronous Receive/Transmit (UART) interface 50, which may be connected to an external debugging device (not shown)nor the like. In particular, the external debugging device may be a host or personal computer (PC) running trace debug tools. The main processor 10 writes trace data into the main memory 20. Then, the main processor 10 programs and provides the UART interface 50 with the trace data from the main memory 20 and handles all interrupts and device management required for sending the trace data to the external debugging device.

In summary, for embedded system there may be a provision for a trace feature used to send run-time debug information through an on-board interface to the external debugging device. In general, it is desired to minimize trace information because it involves processing by the main processor 10, such as interrupts etc., to manage the interface unit 50.

However, to properly understand software problems it is better to have available as much trace information as possible. Specifically, it is desired to obtain trace information about the runtime behavior of application objects.

It is therefore an object of the present invention to provide a processing device, tracing system and method, by means of which the available amount of trace information can be increased without needing to interrupt the main processor.

This object is achieved by processing device as claimed in claim 1, a tracing method as claimed in claim 9, and a tracing system as claimed in claim 13.

Accordingly, a trace co-processor or co-processing function is provided to relieve the main processor of tasks relating to tracing and providing trace information to external devices. In this manner, sufficient trace information can be made available without influencing the performance of the main processor. An application trace can thus even be generated at peak load situations of the main processor with no or at least minimum device management tasks to be performed by the main processor. This provides for an important contribution to remote analysis and debugging techniques with help of trace log files. The proposed solution is thus particularly useful for processing devices which do not have sufficient time and resources to process trace information on their own.

The trace memory means may comprise a dual-port random access memory or any kind of multiple-port memory. Thereby, the processor means can be connected to one port of the dual-port random access memory, while the trace processor means can be connected to the other port. The trace processor means may thus work autonomously on its own and does not need to access the bus system(s) of the processor means. The only intervention of participation of the processor means may then be the act of enabling the trace processor means. The dual-port random access memory may be a separate unit or device, or may be integrated to the main memory of the processor means. In the latter case, chip area can be reduced, as the main memory and the trace memory means can be integrated into a single memory unit.

Furthermore, the output interface and the trace processor means may be integrated into the same chip with predetermined fixed transmission parameters. Thus, programming overhead by the processor means can be reduced.

As another alternative, the output interface, the trace memory means, and the trace processor means are integrated into the same chip. This serves to reduce the number of bus systems required for communication between individual units.

Specifically, the output interface may be a universal asynchronous transmit and receive interface.

The processor means and the trace processor means may be connected by a control connection, e.g. connection line, used by the processor means to activate the trace processor means. Hence, only a single connection line, such a chip select control line, can be used for communication between the processor means and the trace processor means.

The processor means and the trace memory means may be connected by first bus means, while the trace processor means and the trace memory means may be connected by a second bus means. This serves to minimize disturbance of the processor means, as the trace processor means uses its own second bus means for accessing the trace memory means.

The tracing method may be specified in that a start address and amount of data, e.g. number of bytes, of the trace information is determined and used for accessing the trace memory means. Thereby, the trace processing function may just pick up the predetermined amount of trace data from the given start address and then forwards it to the external debugging device. As a specific example, an information indicating the amount of data may be stored at the determined start address. At least one of the start address and the amount of data may be programmable via a control input or preset at said trace processing function.

Figure 2:
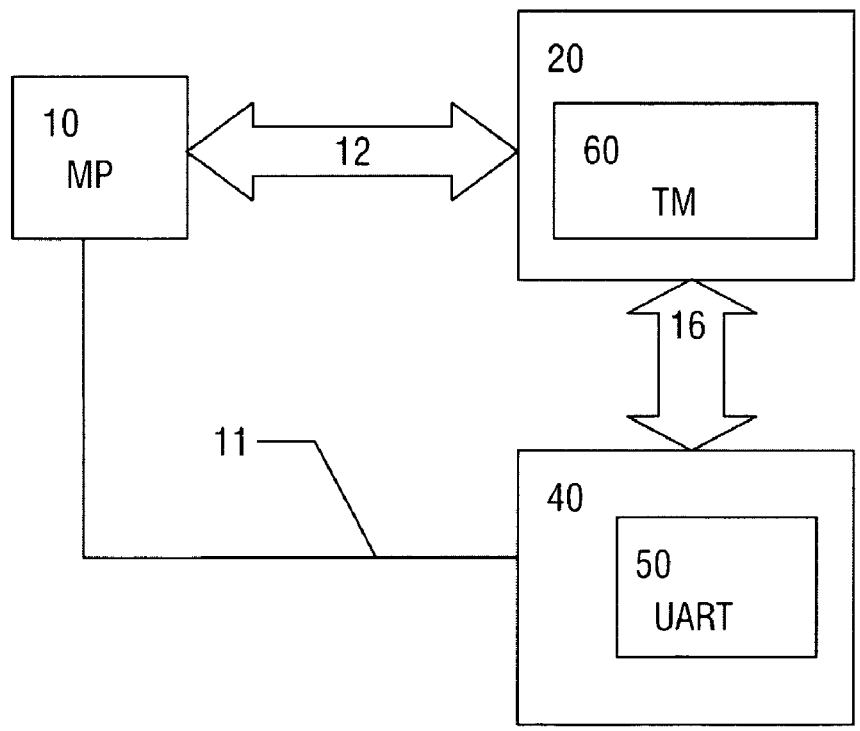
Figure 3:
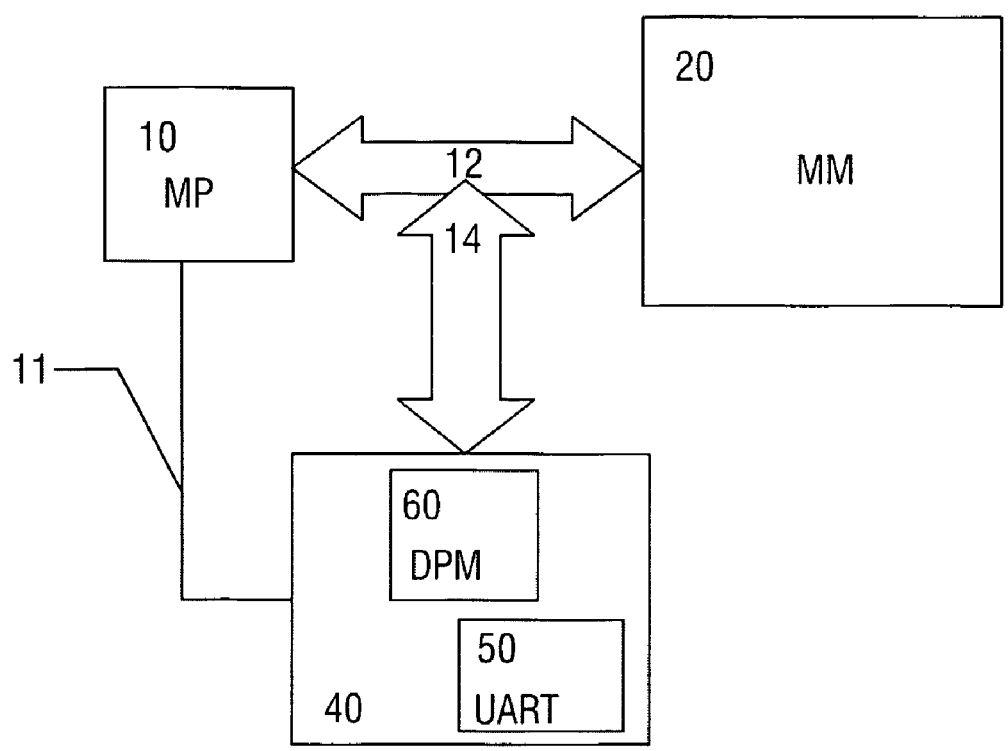
Figure 4:
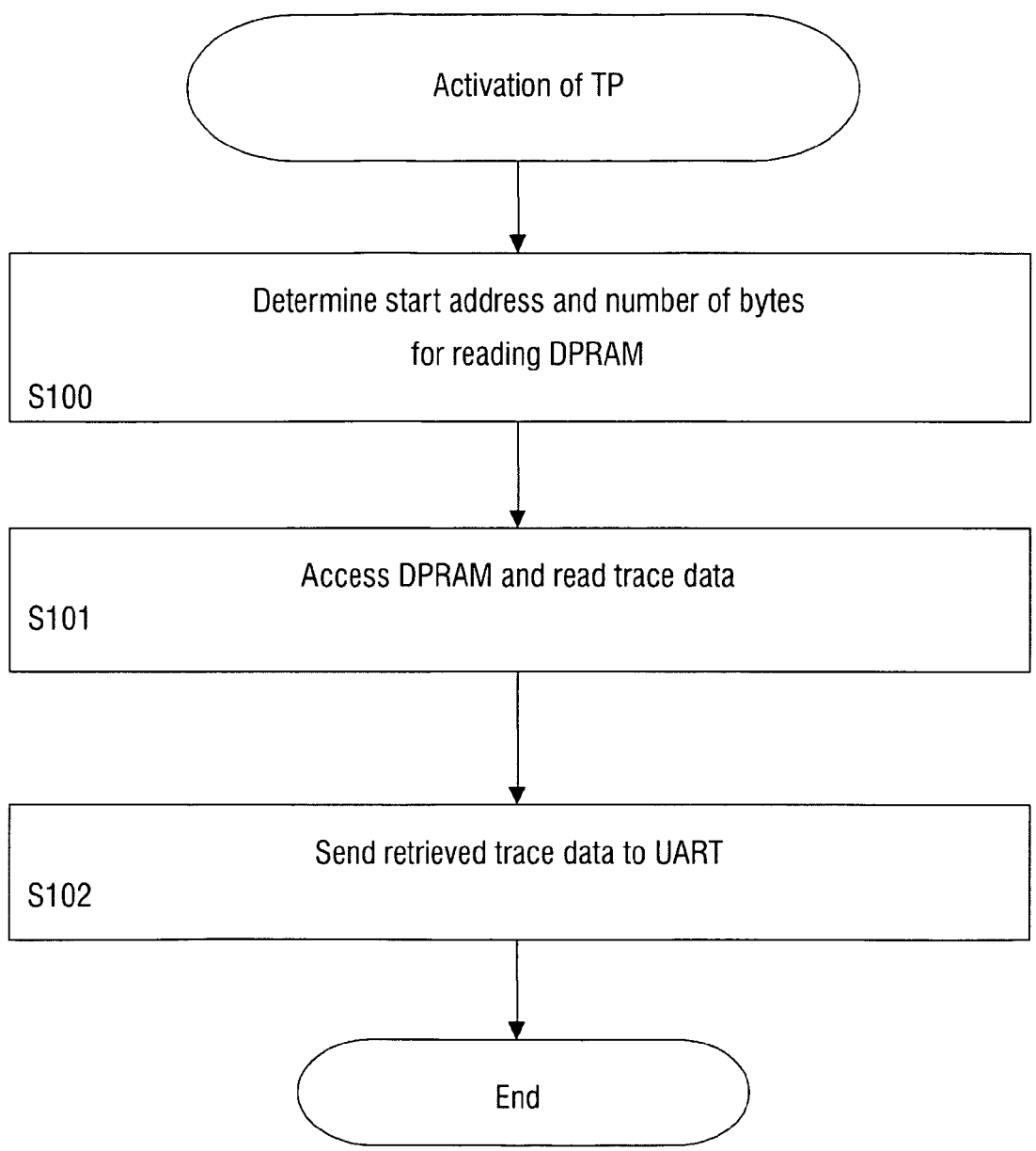

In the following, the present invention will be described in greater detail based on preferred embodiments with reference to the accompanying drawings in which:

FIG. 1 shows a schematic block diagram of a tracing system and processor device according a first preferred embodiment;

FIG. 2 shows a schematic block diagram of a tracing system and processor device according to a second preferred embodiment, FIG. 3 shows a schematic block diagram of a tracing system and processor device according to a third preferred embodiment, FIG. 4 shows a schematic flow diagram of a tracing procedure according to the preferred embodiments; and FIG. 5 shows a schematic block diagram of a known conventional tracing system.

The preferred embodiments will now be described on the basis on an embedded system in which a trace feature is used to send run-time debug information through an on-board UART interface 50 to an external debugging device, such as a Personal Computer (PC).

FIG. 1 shows a schematic block diagram of the embedded system with a trace feature according to the first preferred embodiment. The embedded system comprises a main processor 10 which is connected to a main memory 20 via a first bus system 12. Additionally, a second bus system 14 is provided for connecting the main processor 10 to a first port of a dual-port memory 30, such as a Dual-Port RAM (DPRAM). An additional trace co-processor 40 is connected via an additional third bus system 16 to a second port of the dual-port memory 30. Additionally, the trace co-processor 40 is connected via a control line 11 to the main processor 10. The UART interface 50 is connected via a fourth bus system 18 to the trace co-processor 40.

As shown in FIG. 1, trace information generated by the main processor 10 can be dumped or stored into the dual-port memory 30. Then, the trace co-processor 40 only needs to be enabled by the main processor 10 via the control line 11 to send or forward the trace information to the UART interface 50 via the fourth bus system 18. Once enabled by the control signal via the control line 11, the trace co-processor sends the trace information or trace data to the UART interface 50. The trace information can be arranged in the dual-port memory 30 in such a way that the first address contains the amount of trace data, e.g. number of bytes, to be transferred. The start address could be a predetermined fixed address or an address determined from any previous trace data read from the dual-port memory 30. Thereby, the trace co-processor 40 can be very simple to implement. For example, once the total number of bytes of the trace information has been sent to the UART interface 50, the trace co-processor 40 deactivates itself. This way, the main processor 10 is not disturbed at all. The only thing the main processor 10 has to do is to enable the trace co-processor 40 when the trace information is ready, e.g. has been stored in the dual-port memory 30. Thereby, sufficient trace information can be provided without substantial interruption of the device processing done by the main processor 10.

The trace co-processor 40 works autonomously on its own and does not need to access the first or second bus systems 12, 14 of the main processor 10. The only intervention or interruption of the main processor 10 is done for enabling the trace co-processor 40.

The trace co-processor 40 may analyze and/or compress the derived trace information or may simply forward it via the UART interface 50 to the external debugging device.

As an alternative, the main processor 10 may store traceable objects in the dual-port memory 30 and the trace co-processor 40 may generate the trace information autonomously.

Generally, the present system may relate to any software objects which need to be traced run-time for analysis. Traceable objects can be updated directly into the dual-port memory 30 and the trace co-processor 40 can read them. The trace information may relate to higher-level software or application objects. A special instruction set is not required for the trace feature. For example, care may be taken for data getting transferred from different Real-Time Operating System (RTOS) tasks etc.

The main processor 10 may be any main computational unit such as a micro-processor or any other processing unit. The first and second bus system 12, 14 may be parallel bus systems based on the capabilities of the main processor 10, e.g. 32-bit, 16-bit processor etc. The dual-port memory 30 may be replaced by any multi-port memory device. It may have two or more ports, of which one is accessed by the main processor 10 and another one is accessed by the trace co-processor 40. In particular, the dual-port memory 30 may be used for trace data only. Hence, it can have a small capacity based on the amount of trace data to be generated by a particular application. The UART interface 50 can be any standard communication interface device, e.g., parallel ports or the like. The fourth data bus 18 may be a parallel bus, e.g. for 8-bit data to provide a facility for communication between the trace co-processor 40 and the UART interface 50. Similarly, the trace co-processor 40 may have a byte access to the dual-port memory 30. As already mentioned above, the connection between the main processor and the trace co-processor 40 may be a single line 11, such as a chip select control line.

FIG. 2 shows a modification of the tracing system according to a second preferred embodiment, where the trace co-processor 40 and the UART interface 50 are. integrated onto the same chip with fixed parameters, like baud rate etc., sufficient enough to handle the required rate of trace data. Thereby, programming overhead by the main processor 10 can be reduced. Additionally, in the second preferred embodiment, the dual-port memory is integrated into the main memory 20 as a trace memory 60. In this case, of course, the main memory 20 must be arranged as a multi-port memory or dual-port memory having at least two different access ports to which the first bus system 12 and the third bus system 16 can be connected.

The second preferred embodiment provides the advantage that the second bus system 14 and the fifth bus system 18 can be dispensed with, thus reducing space requirements on the chip. Of course, the above two modifications introduced in the second preferred embodiments not necessarily have to be applied together, and the first preferred embodiment may be modified by introducing only one of the above two modifications, i.e. either integrating the dual-port memory 30 into the main memory 20 or integrating the UART interface 50 into the trace co-processor 40.

FIG. 3 shows a further modification of the tracing system according to a third preferred embodiment, where the trace co-processor 40, the UART interface 50 and the dual-port memory 30 are integrated onto the same chip. In this case, the second bus system 14 can be used for providing a connecting between the first port of the dual-port memory 30, while the connection to the second port of the dual-port memory 30 is integrated on the chip of the trace co-processor 40. Hence, the number of required bus systems can be minimized.

FIG. 4 shows a schematic flow diagram of a tracing procedure as can be implemented in the above first to third preferred embodiments. The tracing procedure is activated or enabled by a corresponding control signal, e.g. a chip enable signal or the like, issued by the main processor 10 via the control line 11 to the trace co-processor 40. In response to this activation, the trace co-processor 40 determines in step S100 a start address and amount of data, e.g. number of bytes, for reading the dual-port memory (e.g. DPRAM) 30 (in the first preferred embodiment) or the trace memory 60 (in the second preferred embodiment). The start address may be a predetermined fixed address or may be derived from an end address of the last retrieved trace information or may have been provided in any other suitable way by the last retrieved trace information. The number of bytes may be derived from an information stored or preset in the dual-port memory 30 or trace memory 60 at the determined start address.

As an alternative, at least one of the start address and number of bytes may be signaled or programmed by the main processor 10 via the control line 11. For this purpose, a serial transmission may be used if the control line 11 is a single line, or a parallel transmission may be used if the control line 11 comprises several data lines.

Then, in step S101 the trace co-processor 40 accesses the dual-port memory 30 or the trace memory 60, respectively, using the start address and reads the stored trace data. Finally, in step S102, the trace co-processor 40 sends or forwards the retrieved trace data to the UART interface 50 in order to supply the trace data to the external debugging device.

In summary, the trace co-processor 40 is provided in order to relieve the main processor 10 of tasks relating to tracing. In this manner, sufficient trace information can be made available to external debugging devices without influencing the performance of the main processor 10.

It is noted that the present invention is not restricted to the above-preferred embodiments and can be used in any system comprising processors which require a tracing feature, in particular embedded systems. The UART interface 50 may be any interface unit which provides connection to external debugging devices. Furthermore, the dual-port memory 30 may be replaced by any type of memory having at least two access ports for providing independent memory access to the main memory 10 and the trace co-processor 40. The preferred embodiments may thus vary within the scope of the attached claims.

The invention claimed is:

1. A processing device for processing data based on an application program, the processing device comprising:
   an output interface;
   a main processor;
   a trace processor distinct from the main processor; and
   a trace memory accessible by the main processor via a first port of the trace memory and accessible to the trace processor via a second port of the trace memory, wherein the main processor is configured for:
      processing of the data;
      capturing trace information;
      sending the trace information to the first port of the trace memory; and
      sending an enabling signal to the trace processor;
   the trace memory is configured for storing store trace information received from the main processor; and
   the trace processor is configured for:
      accessing the trace memory via the second port of the trace memory to read the trace information;
      receiving the enabling signal from the main processor; and
      in response to the enabling signal, forwarding the trace information to the output interface of the processing device,
   wherein the accessing of the trace memory by the trace processor occurs without interruption of the processing of the data by the main processor.

2. The processing device according to claim 1, wherein the trace memory comprises a memory selected from the group consisting of a dual-port random access memory and a multiple-port random access memory.

3. The processing device according to claim 2, wherein the dual-port random access memory is integrated to a main memory of the main processor.

4. The processing device according to claim 1, wherein the output interface and the trace processor are integrated into a same chip with predetermined fixed transmission parameters.

5. The processing device according to claim 1, wherein the output interface, the trace memory and the trace processor are integrated into a same chip.

6. The processing device according to preceding claim 1, wherein the output interface is a universal asynchronous transmit and receive interface.

7. The processing device according to claim 1, further comprising a control connection for connecting the main processor to the trace processor, wherein the control connection is used by the main processor to send the activation signal to the trace processor.

8. The processing device according to claim 1, further comprising a first bus for connecting the main processor to the trace memory and a second bus for connecting the trace processor to the trace memory.

9. A tracing method for providing trace information relating to an application program operating on a main processor, the tracing method comprising:
   configuring a trace memory for access by the main processor via a first port of the trace memory and for access by a trace processor via a second port of the trace memory, wherein the trace processor is distinct from the main processor;
   configuring the main processor for:
      processing of the data;
      capturing trace information;
      sending the trace information to the first port of the trace memory; and
      sending an enabling signal to the trace processor;
   storing trace information received from the main processor in the trace memory; and
   configuring a trace processor for:
      accessing the trace memory via the second port to read the trace information using a trace processing function;
      receiving the enabling signal from the main processor; and
      in response to the enabling signal, forwarding the trace information to the output interface of the processing device,
   wherein the accessing of the trace memory by the trace processor using a trace processing function occurs without interruption of the processing of the data by the main processor.

10. A tracing method according to claim 9, further comprising determining a start address and an amount of data of the trace information and using the determined start address and the amount of data in accessing the trace memory via the second port to read the trace information.

11. A tracing method according to claim 10, further comprising deriving the amount of data from information stored at the start address.

12. A tracing method according to claim 10, further comprising programming at least one of the start address and the amount of data via a control input, or presetting at least one of the start address and the amount of data at the trace processing function.

13. A tracing system for providing a debugging device with trace information relating to an application program, the system comprising:
- a main processor;
- a trace processor distinct from the main processor; and
- a trace memory accessible by the main processor via a first port of the trace memory and accessible to the trace processor via a second port of the trace memory, wherein the main processor is configured for:
- processing of the data;
- capturing trace information;
- sending the trace information to the first port of the trace memory; and
- sending an enabling signal to the trace processor;

the trace memory is configured for storing trace information received from the main processor; and the trace processor is configured for:
- accessing the trace memory via the second port of the trace memory to read the trace information;
- receiving the enabling signal from the main processor; and
- in response to the enabling signal, forwarding the trace information to the debugging device, wherein the accessing of the trace memory by the trace processor occurs without interruption of the processing of the data by the main processor.

* * * * *